US009542206B2

(12) United States Patent
Bieswanger et al.

(10) Patent No.: US 9,542,206 B2
(45) Date of Patent: Jan. 10, 2017

(54) CONTROLLING THE CONFIGURATION OF COMPUTER SYSTEMS

(71) Applicant: International Business Machines Corporation, Armonk, NY (US)

(72) Inventors: Andreas Bieswanger, Ehningen (DE); Dirk Bolte, Birkenfeld (DE); Carl Mayer, Bissingen a.d. Teck (DE); Thomas Pohl, Bempflingen (DE); Martin Troester, Renningen (DE)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/593,009

(22) Filed: Jan. 9, 2015

(65) Prior Publication Data
US 2015/0199204 A1 Jul. 16, 2015

(30) Foreign Application Priority Data
Jan. 10, 2014 (GB) .................................. 1400380.0

(51) Int. Cl.
*G06F 21/00* (2013.01)
*G06F 9/445* (2006.01)
*G06F 21/44* (2013.01)
*G06F 21/73* (2013.01)

(52) U.S. Cl.
CPC ........... *G06F 9/44505* (2013.01); *G06F 8/665* (2013.01); *G06F 21/44* (2013.01); *G06F 21/73* (2013.01)

(58) Field of Classification Search
CPC ...... G06F 9/44505; G06F 21/44; G06F 21/73; G06F 8/665
See application file for complete search history.

(56) References Cited

U.S. PATENT DOCUMENTS

| 5,734,819 | A | 3/1998 | Lewis | |
|---|---|---|---|---|
| 5,841,865 | A * | 11/1998 | Sudia | G06Q 20/02 380/277 |
| 6,032,257 | A | 2/2000 | Olarig et al. | |
| 7,373,308 | B2 | 5/2008 | Merkin et al. | |
| 7,707,369 | B2 | 4/2010 | Nulkar et al. | |
| 7,711,945 | B2 | 5/2010 | Shih | |
| 9,117,069 | B2 * | 8/2015 | Oliphant | H04L 63/1416 |

(Continued)

*Primary Examiner* — Mahfuzur Rahman
(74) *Attorney, Agent, or Firm* — Lieberman & Brandsdorfer, LLC

(57) ABSTRACT

Embodiments relate to controlling configuration of a computer system comprising one or more exchangeable components. The exchangeable components comprising identification means to store an identifier. A pair of a private key and a public key are generated for each accepted manufacturer of the exchangeable components and a pair of a private key and a public key for the computer system; assigning an identifier for each exchangeable component available for attachment to the system; receiving configuration data comprising a list of encrypted identity records comprising identifiers of the components together with signatures over the data generated with the private key of the respective component manufacturer for each component expected to be attached to the system; and receiving a configuration record. The configuration data of the expected components from the received configuration record is compared with the configuration data of the components attached to the system.

4 Claims, 5 Drawing Sheets

(56) References Cited

U.S. PATENT DOCUMENTS

| | | | |
|---|---|---|---|
| 2002/0082884 A1* | 6/2002 | Moroney | G06F 17/50 705/7.26 |
| 2003/0101148 A1* | 5/2003 | Montgomery | G07B 17/00508 705/404 |
| 2005/0049976 A1 | 3/2005 | Yang | |
| 2009/0276786 A1 | 11/2009 | Bavaria et al. | |
| 2011/0010543 A1* | 1/2011 | Schmidt | H04W 12/10 713/168 |
| 2011/0029783 A1* | 2/2011 | Thorsen | G06F 21/73 713/189 |
| 2011/0185187 A1 | 7/2011 | Martin et al. | |
| 2013/0097314 A1 | 4/2013 | Austen et al. | |
| 2013/0097694 A1 | 4/2013 | Dang et al. | |
| 2014/0223583 A1* | 8/2014 | Wegner | G06F 17/50 726/33 |
| 2014/0250215 A1* | 9/2014 | Bowen | G06F 21/57 709/223 |

* cited by examiner

CONTROLLING THE CONFIGURATION OF COMPUTER SYSTEMS

CROSS REFERENCE TO RELATED APPLICATIONS

This application claims priority under 35 U.S.C. §119 from Great Britain Application No. 1400380.0 filed Jan. 10, 2014, the entire contents of which are incorporated herein by reference.

BACKGROUND

The present invention relates in general to data processing systems, and in particular, to a method and a system for controlling the configuration of computer systems.

In a complex computer system hardware (HW) environment, such as a high-end server, many subcomponents have to be managed and supervised. In such a server, a firmware component with system level overview on all reported ("detected") components is used for configuration management and validation. With the increasing amount of hardware components installed, the problem of how to be sure that HW detection is complete becomes an increasingly important factor.

A state of the art solution in a mainframe is to identify all HW components via their Vital Product Data (VPD), compare current sensing results to previously detected HW components, and use timeouts to wait for hardware entities. However, defining the correct timeout period is a critical value, and long timeout periods contradict the requirement of firmware to report available HW components instantly to keep customer impact at a minimum. Additionally, this approach has further drawbacks, such as not being able to detect a newly plugged defective HW component, e.g. due to a defective connector.

As computer-based systems continue to become more advanced, an increasing number of device manufacturers are producing devices that can be used in conjunction with such systems (e.g., in a plug and play manner). However, this may lead to an introduction of unqualified and/or unauthorized (e.g., "grey market") hardware components into computing systems. The introduction of such hardware components may negatively affect the reliability of the computing systems, warranty costs, and/or user productivity.

U.S. Patent Publication No. 2013/0097694 A1 discloses an approach for protecting electronic devices against the use of unqualified and/or unauthorized hardware components. Specifically a hardware component that a user is attempting to use with an electronic device is detected. Then, the device information associated with the hardware component (e.g., serial number, vital product data (VPD), etc.) is identified from the hardware component (e.g., as stored therein). The device information is then compared to a data structure (e.g., stored in a computer storage device) that identifies authorization indicia, such as, e.g., a set of known hardware components and associated component information. Based on this comparison, it is determined whether the hardware component is authorized to be used in conjunction with the electronic device. If not, the use of the hardware component in conjunction with the electronic device is prevented, and an alert is generated.

Thus, U.S. Patent Publication No. 2013/0097694 A1 provides a computer-implemented method for protecting electronic devices against use of unauthorized hardware, comprising: detecting a hardware component that a user is attempting to use with an electronic device; identifying device information associated with the hardware component from the hardware component; comparing the device information against a data structure that identifies authorization indicia, the data structure being stored in at least one computer storage device; and determining whether the hardware component is authorized to be used in conjunction with the electronic device based on the comparing.

SUMMARY

It is an object of the invention to provide a computer program product and system for detecting attached components in a computer system which are qualified and authorized to be used with the computer system in a time efficient manner.

According to an aspect, a computer program product and system are provided for controlling configuration of a computer system having one or more exchangeable components. The exchangeable components store an identifier and provide the identifier to the computer system when being attached to it. The functionality includes a series of processes of components executed in sequence. The processes of components generate a private key and a public key as a pair for each accepted manufacturer of the exchangeable components and a private key and a public key as a pair for the computer system. An identifier is assigned to each exchangeable component that is available for attachment to the controlled computer system, and the identifier is stored together with a signature over the identifier generated with the private key of the component manufacturer. The identifier as well as the signature is encrypted with the public key of the computer system. Configuration data is received, the data includes a list of encrypted identity records comprising identifiers of the components together with signatures over the data generated with the private key of the respective component manufacturer for each component expected to be attached to the respective computer system. The data is decrypted with the private key stored on the computer system and the received configuration data is stored together with the signature. A configuration record is received. More specifically, the configuration data pertains to a controlled computer system and the configuration data of the exchangeable components from the received record is compared with the configuration data of the components currently attached to the computer system. Any mismatches from the comparison are reported. The comparison uses the stored identifier stored in the respective identification mean. The signature is verified using the public key of the component manufacturer stored in firmware of the computer system.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

DETAILED DESCRIPTION

Figure 1:
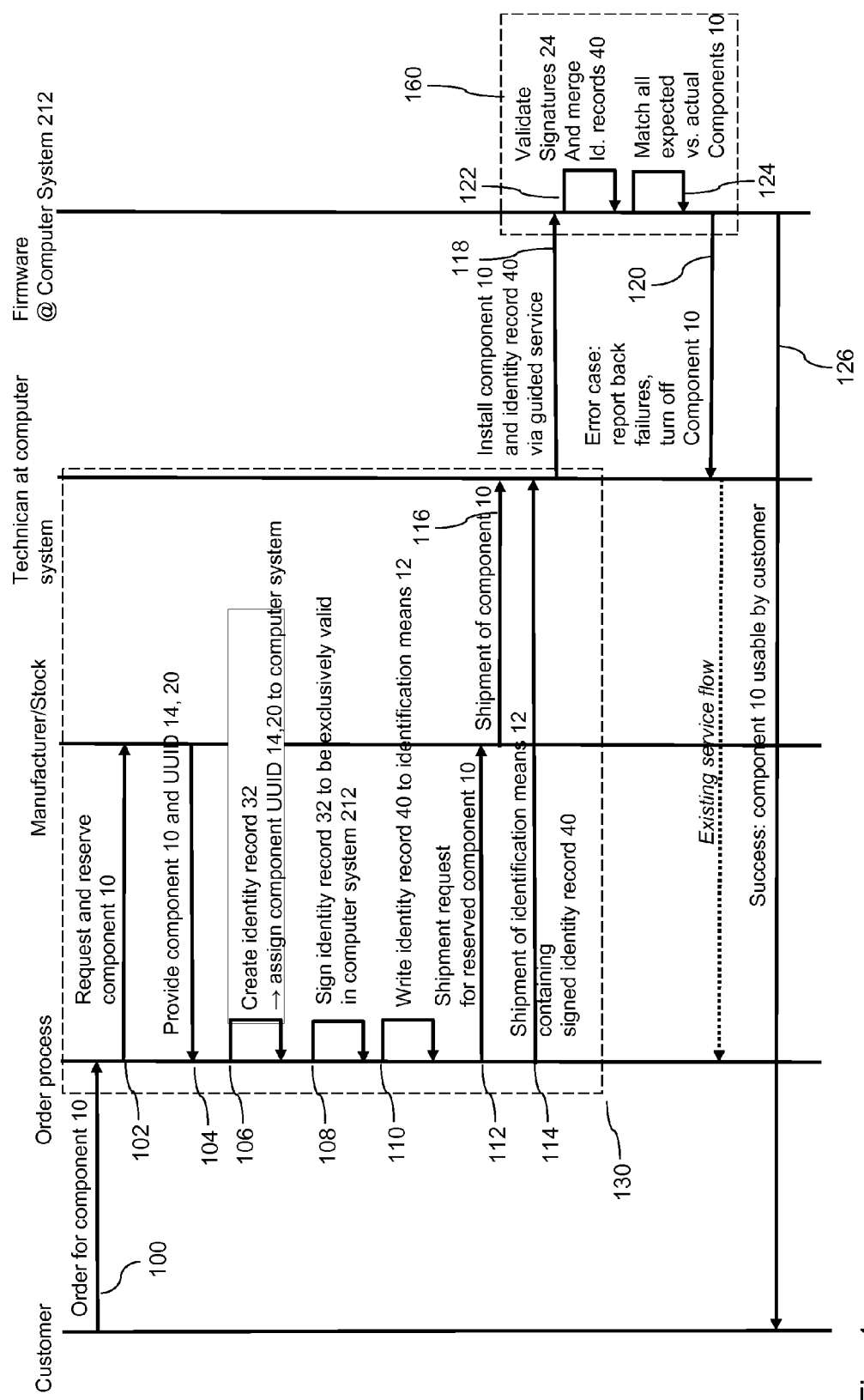
FIG. 1 depicts a process flow for an order process of components under configuration control according to an embodiment of the invention.

According to a first aspect, a system and computer program product are proposed for controlling a configuration of a computer system, comprising one or more exchangeable components. The exchangeable components comprise identification means to store an identifier and providing the identifier to the computer system when being attached to it. The method comprises the following steps: generating a pair of a private key and a public key for each accepted manufacturer of the exchangeable components and a pair of a private key and a public key for the computer system; assigning an identifier for each exchangeable component available for attachment to the controlled computer system and storing the identifier together with a signature over the identifier generated with the private key of the component manufacturer to the respective identification means, the identifier as well as the signature being encrypted with the public key of the computer system, to respective identification means; receiving configuration data comprising a list of encrypted identity records comprising identifiers of the components together with signatures over the data generated with the private key of the respective component manufacturer for each component expected to be attached to the respective computer system, and decrypting the data with the private key stored on the computer system and storing the received configuration data together with the signature generated from the private key of the respective manufacturer for each expected component in a configuration database; receiving a configuration record out of the configuration database comprising configuration data on a controlled computer system and comparing the configuration data of the expected components from the received configuration record with the configuration data of the components currently attached to the computer system, and reporting any mismatches. The comparison uses the identifier stored in the respective identification means. A signature is verified by using the public key of the respective manufacturer stored in a secure location on the system.

The private key of the computer system as well as a copy of the public keys of the accepted component manufacturers are stored in a secure area of the computer system, only accessible to firmware.

The core idea is to create an expected configuration, make it available to a hardware management entity and validate the actual configuration against the expected configuration. The advantages exhibited with implementation of the core idea are that a component missing from the configuration is detected reliably. This ensures firmware can trigger the required actions before this becomes visible to the customer (notify support, call out the component, etc.). Further, no timeouts are required, keeping a customer impact of component sensing minimal Additionally, this process can be used for asset protection purposes in case the detected configuration exceeds/differs from the expected configuration, which again can trigger corrective actions.

In an environment where all components are ordered from a single source, this "expected" configuration can be created by the order process. The order process would have to create identity records per expected unit (e.g. per Field Replaceable Unit (FRU)), defining the unit uniquely. These identity records can be applied to a hardware management entity during initial personalization of the system in manufacturing according to the customer order. For system service or hardware upgrades the identity records may be applied by a service engineer. On the hardware management entity, this identity record may be imported to the database of expected identity records. With this information, a firmware application on this hardware management entity can match the expected and the actual configuration and trigger the required actions in case of mismatches.

The identity records may be stored and shipped on information means, like e.g. a CD, but the same information may also be stored in the hardware itself, e.g. in an EEPROM.

Additionally, asset protection may be achieved by signing those identity records containing the identifier of the component as a component identifier with a private key of a manufacturer. This approach is not limited to an environment with a central order system, but could also be used in an environment with multiple hardware vendors, where the "expected HW entity" records are created by various manufacturers which are then imported into the hardware management entity.

The inventive aspect aim at enhancing an order process to specifically maintain a relation between a shipped system and the hardware in this system. This relation is protected by cryptographic signatures and maintained in the central order system. This central system may also be offered to manufacturers to consume this as a service to couple hardware parts to specific systems and ensure no other hardware outside of this process can be installed to the system. The checking is finally performed on the system in the firmware layer during installation and runtime.

Completeness of the installed configuration can be reliably detected, as there is no need to wait a certain timeout period if all expected components are detected. Mismatches are detected reliably and plugging of unsupported HW is detected reliably.

In a favorable embodiment a world-wide unique number, like e.g. a universally unique identifier (UUID) may be used as the identifier for each exchangeable component. By using a UUID the method is expandable to worldwide distributed manufacturers and systems without risking of doubling identities and mixing up information on different components.

Advantageously, an asynchronous process may be used for encryption/decryption and signing of the identifier comprising the private key and the public key of the computer system in conjunction with signatures from each accepted manufacturer of the exchangeable components. Thus, the different steps of the process may be executed on remote locations and on different schedules as several parties as computer system manufacturer, customer, manufacturers of components, service engineers and the operator of a computer system may be involved.

In a favorable embodiment, a signature may be created for validating the identifier of the component using the private key of the component manufacturer for creating the signature of the manufacturer and/or encrypting with the public key of the computer system in order to validate the configuration data.

Advantageously, the identifier may be decrypted with the private key of the computer system and/or the signature may be validated on the computer system using the public key of the component manufacturer. Thus, the configuration data is kept secret during the sensitive shipping process and it is guaranteed that the information is only decrypted at the location of the computer system the components are attached to.

Due to an advantageous embodiment, an identity record may be created comprising the steps: requesting a component from a manufacturer by a component order; providing a world-wide unique number as an identifier for the component by the manufacturer; creating the identity record comprising the world-wide unique number as well as optional identification data of the computer system and a customer of the computer system for asset protection; and signing the identity record with the signature using the private key of the manufacturer.

Favorably, information from the component order comprising a system ID of the computer system can be stored in the identity record. Thus, additional configuration data are used for system integrity confirmation.

Beneficially, the identification means may be provided on a separate way from providing the component to the computer system. This is performed to ensure the privacy of the sensitive information about the component and the computer system.

In a favorable embodiment, validating the identity record may comprise creating a checksum of the world-wide unique number and the system ID of the computer system, as this process is an additional feature for ensuring integrity of the information involved in the inventive method.

Advantageously, when a component is attached to the computer system, steps may be performed of reading the identity record from the identity means; retrieving the system ID of the computer system; decrypting with the private key of the computer system and validating the signature of the identity record with the public key of the manufacturer; importing the configuration data into the configuration database of the computer system; connecting the component to the computer system; sensing the actual configuration data of the components currently attached to the computer system; and comparing the configuration data of the expected components from the received configuration records with the configuration data of the components currently attached to the computer system.

In a favorable embodiment, the method may comprise the step of enabling components which are already attached but not enabled to the computer system. By this way, additional components or features in the computer system which are not used until now may be enabled and thus the computing power or storage capabilities or the like enhanced in a controlled manner.

According to a further advantageous aspect of the invention, the described method may be used for asset protection of the computer system ensuring the attachment of authorized and functional components. By this method the computer system may be protected against the attachment of components from non-authorized manufacturers as well as the connection of components which may be non-functional, defective or even exhibit features being not compliant with the interfaces and services of the computer system.

According to a further advantageous aspect of the invention, a data processing program for execution in a data processing system is proposed comprising an implementation of an instruction set for performing a method as described above when the data processing program is run on a computer.

Further, a favorable computer program product is proposed comprising a computer usable medium including a computer readable program, wherein the computer readable program when executed on a computer causes the computer to perform a method for controlling a configuration of a computer system comprising one or more exchangeable components, the exchangeable components comprising identification means to store an identifier and providing the identifier to the computer system when being attached to it, comprising the steps of generating a pair of a private key and a public key for each accepted manufacturer of the exchangeable components and a pair of a private key and a public key for the computer system; assigning an identifier for each exchangeable component available for attachment to the controlled computer system and storing the identifier together with a signature over the identifier generated with the private key of the component manufacturer to the respective identification means, the identifier as well as the signature being encrypted with the public key of the computer system, to respective identification means; receiving configuration data comprising a list of encrypted identity records comprising identifiers of the components together with signatures over the data generated with the private key of the respective component manufacturer for each component expected to be attached to the respective computer system, and decrypting the data with the private key stored on the computer system and storing the received configuration data together with the signature generated from the private key of the respective manufacturer for each expected component in a configuration database; and receiving a configuration record out of the configuration database comprising configuration data on a controlled computer system and comparing the configuration data of the expected components from the received configuration record with the configuration data of the components currently attached to the computer system, and reporting any mismatches, wherein the comparison uses the identifier stored in the respective identification means, and wherein a signature is verified by using the public key of the component manufacturer stored in a secure area in the firmware of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is proposed, comprising software code portions for performing a method described above.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts a process flow for an order process of components (10) under configuration control according to an embodiment of the invention. The method for controlling a configuration of a computer system (212) comprises one or more exchangeable components (10). The exchangeable components (10) comprise identification means (12) to store an identifier (14) and provide the identifier (14) to the computer system (212) when being attached to it. The method comprises the following steps: generating a pair of keys, assigning an identifier, receiving configuration data, and receiving a configuration record. The step of generating a pair of keys includes generating a private key (16) and a public key (18) for each accepted manufacturer of the exchangeable components (10) and a pair of a private key (17) and a public key (19) for the computer system (212). The steps of assigning an identifier includes assigning an identifier (14) for each exchangeable component (10) available for attachment to the controlled computer system (212) and storing the identifier (14) together with a signature (24) over the identifier (14) generated with the private key (16) of the component manufacturer to the respective identification means (12). The identifier (14) as well as the signature (24) is encrypted with the public key (19) of the computer system (212), to respective identification means (12). Configuration data (22) is received. The configuration data (22) comprises a list of encrypted identity records (40) comprising identifiers (14) of the components (10) together with signatures (24) over the data generated with the private key (16) of the respective component manufacturer for each component (10) expected to be attached to the respective computer system (212). Data with the private key (17) stored on the computer system (212) is decrypted, and the received configuration data (22) is stored together with the signature (24) generated from the private key (16) of the respective manufacturer for each expected component (10) in a configuration database (26). A configuration record (28) is received out of the configuration database (26). The configuration record (28) comprises configuration data (22) on a controlled computer system (212). The configuration data (22) of the expected components (10) from the received configuration record (28) is compared with the configuration data (30) of the components (10) currently attached to the computer system (212). Any mismatches from the comparison are reported. The comparison uses the identifier (14) stored in the respective identification means (12). A signature (24) is verified by using the public key (18) of the component manufacturer stored in a secure area in the firmware of the computer system (212). Details about receiving configuration data (22), (30), which are stored in configuration records (28) on the configuration database (26) of the computer system (212), are explained in FIG. 6.

A world-wide unique number (20), like e.g. a universally unique identifier (UUID), may be used as the identifier (14) for each exchangeable component (10). Therefore the embodiments described herein are based on the assumption that a world-wide unique number (20) like a UUID is used as an identifier (14).

Referring now to FIG. 1, in step (100) an order for a component (10) is initiated by a customer in an order process. Following step (100), a request and a reservation of a component (10) is placed to a manufacturer (102). Then in step (104), a confirmation for providing the component (10) as well as a worldwide unique number (20) (UUID) as an identifier (14) by the manufacturer follows. An identity record (32) is created (106), assigning the UUID (20) as the identifier (14) of the component (10) to a computer system (212) where it should be attached to. In step (108) the identity record (32) is signed (108) to be exclusively valid in the computer system (212) with the private key (16) for the manufacturer of the component (10) and next stored to identification means (12). In step (110), the signed identity record (40) is written to the identification means (12).

Following step (110), a shipment request for the reserved component (10) is issued to the manufacturer (112), followed by the shipment of the component (10) to a technician at the computer system (212) of the customer, in step (116). In parallel the identification means (12) containing the signed identity record (40) are shipped separately to the technician in step (114). The whole sub process (130) comprising the steps (102) to (114) are explained in more detail in FIG. 2. The technician then installs the component (10) as well as the identity record (40) on the firmware of the computer system (212) in step (118). At the computer system (212) the signatures are validated in step (122) with the public key (18) for the manufacturer, followed by the matching process of all expected versus the actual detected components (10) of the computer system (212) in step (124). If there are any mismatches, a report is going back to the technician in step (120) and the component (10) is turned off. If the matching process was successful, a positive response is returned to the customer in step (126). Sub process (160), comprising steps (122) and (124), is explained in more details in FIG. 6.

Figure 2:
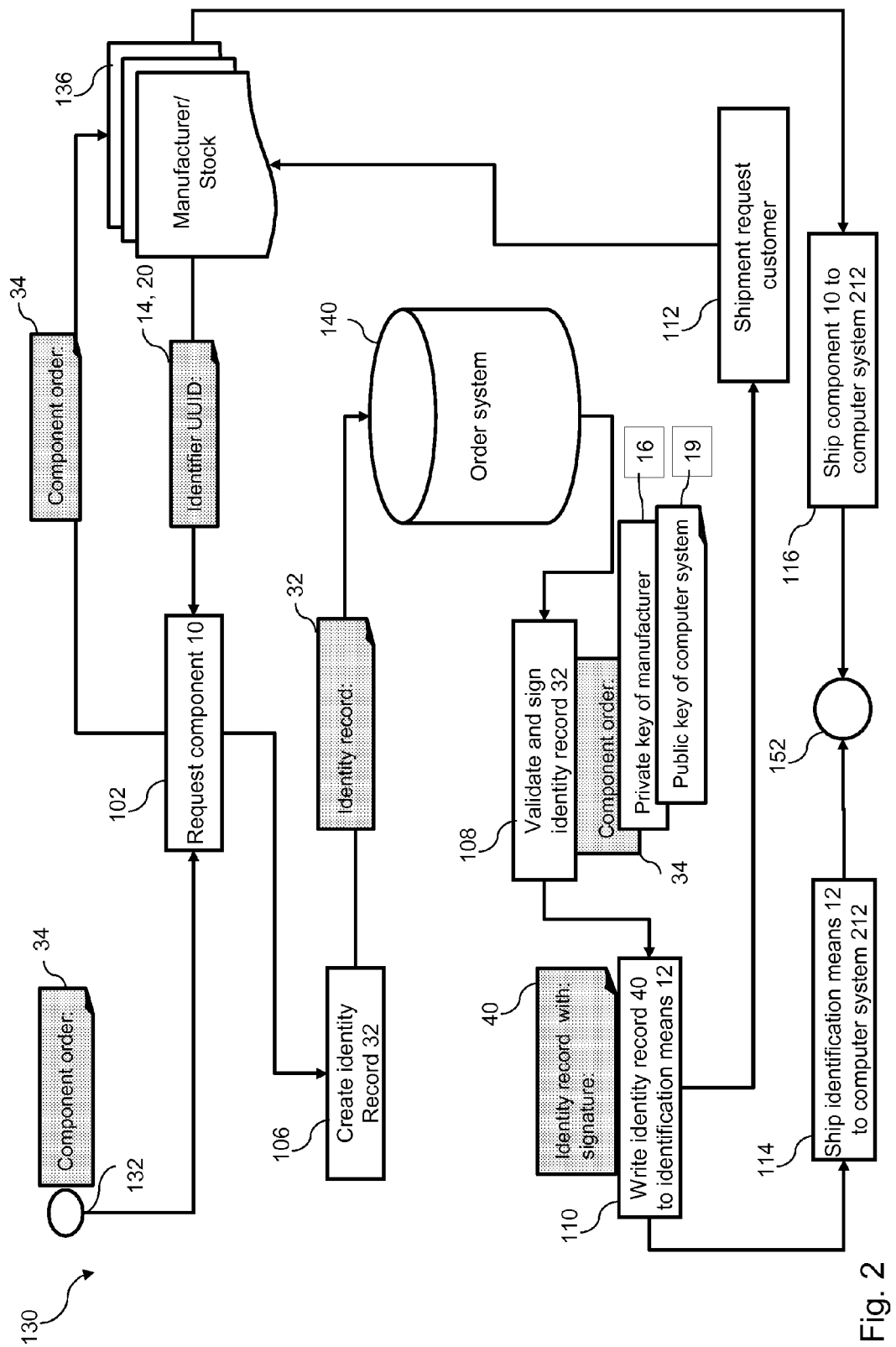
FIG. 2 depicts a basic flow of an identity record generation according to an embodiment of the invention.

FIG. 2 shows a basic flow of the generation of an identity record (32) according to an embodiment of the invention. This sub process (130) of FIG. 1 starts with the component order (34) at step (132). Then in step (102) a request for a component is sent with the component order (34) to the manufacturer (136). The UUID (20) as the identifier (14) is returned by the manufacturer (136) to the request component (102) that initiates the creation of the identity record (32) in step (106).

The identity record (32) is created comprising the following steps: (i) requesting a component (10) from a manufacturer (136) by a component order (34); (ii) providing a world-wide unique number (20) as an identifier (14) for the component (10) by the manufacturer; (iii) creating the identity record (32) comprising the world-wide unique number (20) and optional identification data of the computer system (212) and the customer of the computer system (212) for asset protection; and (iv) signing the identity record (32) with the signature (24) using the private key (16) of the manufacturer (136).

The identity record (32) is managed by a central order system (38) controlling the configuration for the computer system (212). The identity record (32) is fed to the order system (140) which then initiates the validation and signing (108) of the identity record (32), comprising the component order (34), the private key (16) of the manufacturer (for signing), as well as the public key (19) of the computer system (212) (for encryption).

The signed identity record (40) is then written to the identification means (12) in step (110), followed by the shipment to the computer system (212) in step (114). On the other hand the writing of the identity record (40) to the identification means (12) in step (110) also initiated the shipment request (112) to the manufacturer (136), leading to the shipping process (116) of the component (10) to the computer system.

An asynchronous process is used for encryption/decryption and signing of the identifier (14) comprising the private key (17) and the public key (19) of the computer system (212) in conjunction with signatures (24) from each accepted manufacturer of the exchangeable components (10). A signature (24) is created for validating and/or encrypting the identifier (14) of the component (10) using the private key (16) for the component manufacturer for signing as well as the public key (19) of the computer system (212) for encryption. Decryption of the identifier (14) is performed afterwards on the computer system (212) using the private key (17) of the computer system (212) and validation is performed using the public key (18) of the manufacturer.

Figure 3:
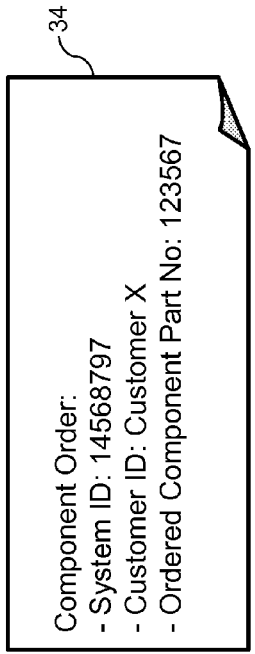
FIG. 3 depicts a definition of a component order record according to an embodiment of the invention.

In FIG. 3, a definition of a component order record (34) according to an embodiment of the invention is shown. The order record (34) comprises at least a system ID (36) of the computer system (212) the ordered component (10) shall be attached to. Further, a customer ID is comprised as well as a component part number specifying the component ordered.

Figure 4:
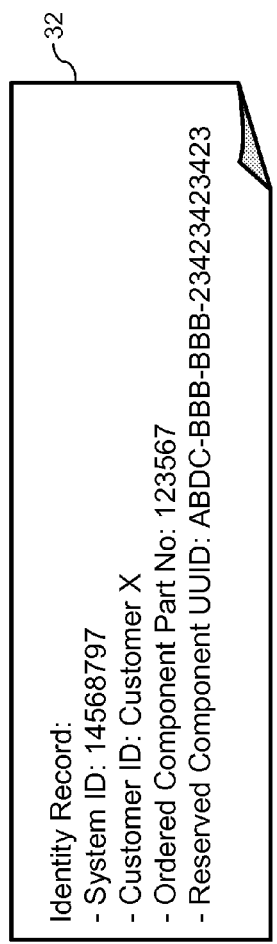
FIG. 4 depicts a definition of an identity record according to an embodiment of the invention.

FIG. 4 shows a definition of an identity record (32) according to an embodiment of the invention. The identity record (32) further comprises, besides the information included from the component order (34) (FIG. 3), at least a worldwide unique number (20) (UUID) of the reserved component (10).

Figure 5:
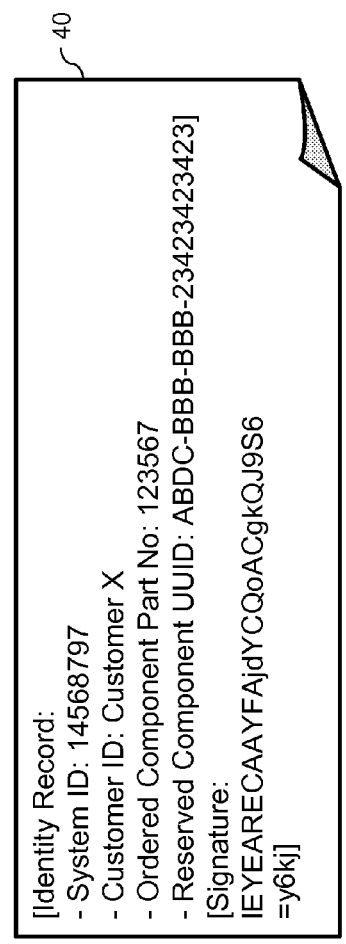
FIG. 5 depicts a definition of an identity record with a signature according to an embodiment of the invention.

FIG. 5 further shows a definition of an identity record (40) with a signature (24) according to an embodiment of the invention. After signing the identity record (32) with the private key of the manufacturer (16), the identity record (40) comprises the information of the signature (24) as well.

Figure 6:
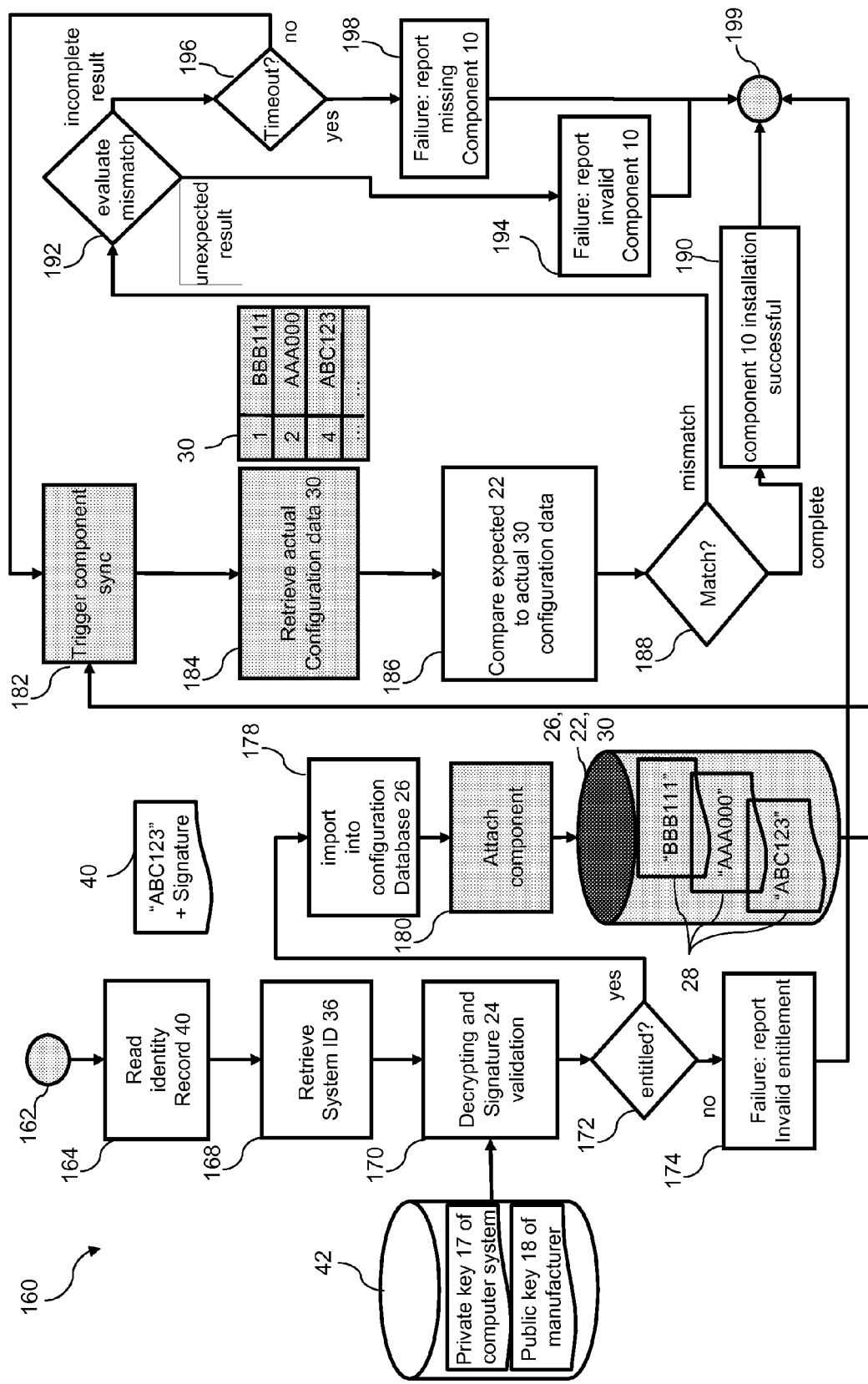
FIG. 6 depicts a process flow for installing a new component using a signed and encrypted identity record according to an embodiment of the invention.

Referring now to FIG. 6, a process flow (160) for installing a new component (10) using a signed and encrypted identity record (40) according to an embodiment of the invention is shown. The grey shaded symbols are process steps according to state of the art. This sub process (160) of FIG. 1 starts after step (162) with reading the signed identity record (40) from the identification means (12) in step (164), followed by retrieving the system ID (36) from the configuration data (22), stored in a configuration database (26) of the computer system (212), in step (168). Then decrypting of the identity record (40) and validation of the signature (24) with the system ID (36) and the component UUID (20) follows in step (170).

The identifier (14), the world wide unique number (20), is decrypted and/or the signature (24) is validated on the computer system (212) using the private key (17) of the computer system (212) for decrypting as well as the public key (18) for the component manufacturer for validating the signature (24). The private key (17) of the computer system (212) and the public key (18) of a component manufacturer are preinstalled on the computer system (212) in a key database (42). Validating the identity record (40) comprises creating a checksum of the world-wide unique number (20) and the system ID (36) of the computer system (212).

Next in step (172) it is queried if the identity record (40) is entitled to be used with the computer system (212). If it is not entitled, a failure report is returned in step (174) and the sub process is ended in step (199). If the identity record (40) is entitled, the data are imported into a configuration database (26) in step (178), followed by attaching the new component (10) to the computer system (212) in step (180), sending configuration data (30) to the configuration database (26) of the computer system (212), which contains already configuration data from various components. Next, a component synchronization is triggered in step (182) followed by retrieving the actual detected configuration data (30) of the component (10) in step (184). These actual detected configuration data (30), which comprise configuration data (30) from various components (10), are then compared to the expected configuration data (22) found in the configuration database (26) in step (186). A query for matching is issued in step (188). If the matching query reports complete then the component installation is successful, step (190), and the sub process (160) is finished in step (199). If a mismatch exists, this mismatch is evaluated in step (192). If there is an unexpected result, a failure report for an invalid component is issued in step (194). If there is an incomplete result a timeout is queried in step (196) and the trigger step (182) is repeated or if there exists a timeout, a failure report for a missing component (10) issued in step (198) and the whole sub process (160) ended in step (199).

The method may also be adapted for enabling components (10) which are already attached but not enabled to the computer system (212). Generally the method may be used for asset protection of the computer system (212) ensuring the attachment of authorized and functional components (10).

Figure 7:
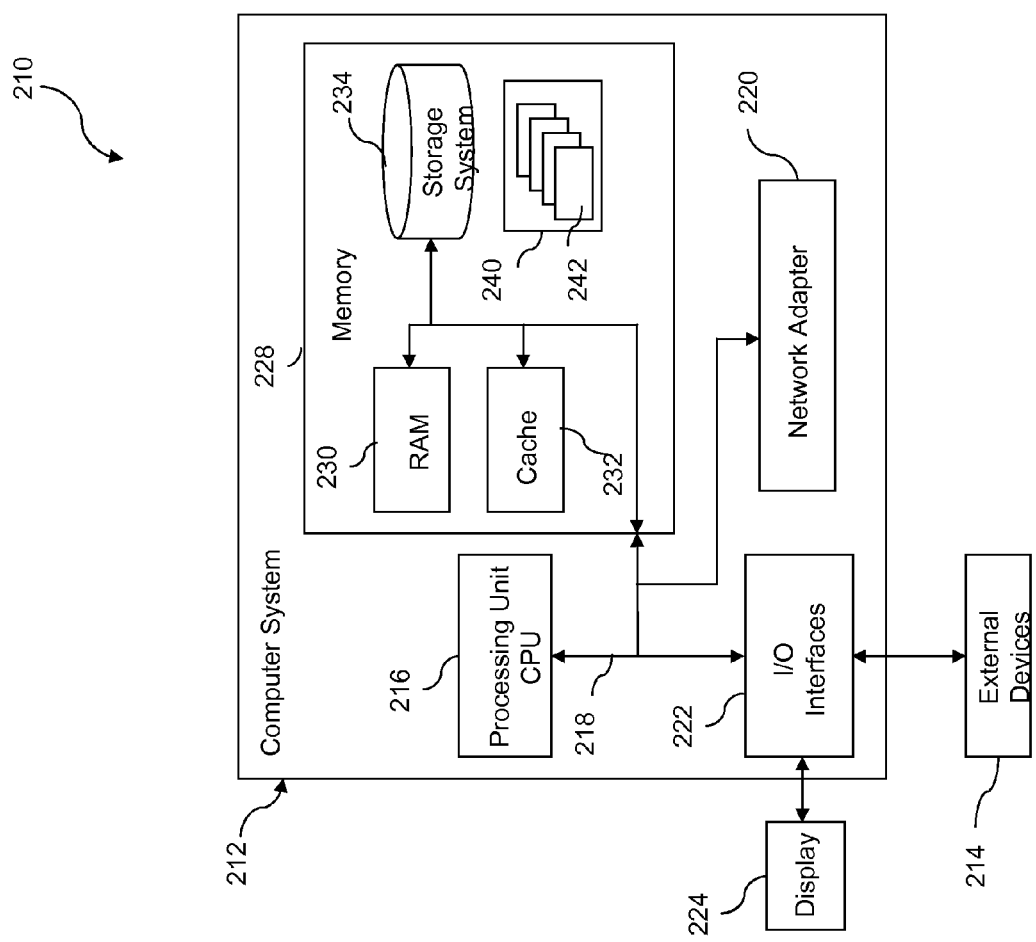
FIG. 7 depicts an example embodiment of a data processing system for carrying out a method according to the invention.

Referring now to FIG. 7, a schematic of an example of a data processing system (210) is shown. Data processing system (210) is only one example of a suitable data processing system and is not intended to suggest any limitation as to the scope of use or functionality of embodiments of the invention described herein. Regardless, data processing system (210) is capable of being implemented and/or performing any of the functionality set forth herein above.

The data processing system (210) is capable of running a computer program product comprising a computer usable medium including a computer readable program, wherein the computer readable program when executed on a computer system (212) causes the computer system (212) to perform a method for controlling a configuration of a computer system (212) comprising one or more exchangeable components (10). The exchangeable components (10) comprise identification means (12) to store an identifier (14) and providing the identifier (14) to the computer system (212) when being attached to it, comprising the steps of: generating a pair of a private key (16) and a public key (18) for each accepted manufacturer of the exchangeable components (10) and a pair of a private key (17) and a public key (19) for the computer system (212); assigning an identifier (14) for each exchangeable component (10) available for attachment to the controlled computer system (212) and storing the identifier (14) together with a signature (24) over the identifier (14) generated with the private key (16) of the component manufacturer to the respective identification means (12), the identifier (14) as well as the signature (24) being encrypted with the public key (19) of the computer system (212), to respective identification means (12); receiving configuration data (22) comprising a list of encrypted identity records (32) comprising identifiers (14) of the components (10) together with signatures (24) over the data generated with the private key (16) of the respective component manufacturer for each component (10) expected to be attached to the respective computer system (212), and decrypting the data with the private key (17) stored on the computer system (212) and storing the received configuration data (22) together with the signature (24) generated from the private key (16) of the respective manufacturer for each expected component (10) in a configuration database (26); receiving a configuration record (28) out of the configuration database (26) comprising configuration data (22) on a controlled computer system (212) and comparing the configuration data (22) of the expected components (10) from the received configuration record (28) with the configuration data (30) of the components (10) currently attached to the computer system (212), and reporting any mismatches, wherein the comparison uses the identifier (14) stored in the respective identification means (12), and wherein a signature (24) is verified by using the public key (18) of the component manufacturer stored in a secure area in the firmware of the computer system (212).

In data processing system (210) there is a computer system/server (212), which is operational with numerous other general purpose or special purpose computing system environments or configurations. Examples of well-known computing systems, environments, and/or configurations that may be suitable for use with computer system/server (212) include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (212) may be described in the general context of computer system executable instructions, such as program modules, being executed by a computer system. Generally, program modules may include routines, programs, objects, components, logic, data structures, and so on that perform particular tasks or implement particular abstract data types. Computer system/server (212) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server (212) in data processing system (210) is shown in the form of a general-purpose computing device. The components of computer system/server (212) may include, but are not limited to, one or more processors or processing units (216), a system memory (228), and a bus (218) that couples various system components including system memory (228) to processor (216). Bus (218) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (212) typically includes a variety of computer system readable media. Such media may be any available media that is accessible by computer system/server (212), and it includes both volatile and non-volatile media, removable and non-removable media.

System memory (228) can include computer system readable media in the form of volatile memory, such as random access memory (RAM) (230) and/or cache memory (232). Computer system/server (212) may further include other removable/non-removable, volatile/non-volatile computer system storage media. By way of example only, storage system (234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (218) by one or more data media interfaces. As will be further depicted and described below, memory (228) may include at least one program product having a set (e.g., at least one) of program modules that are configured to carry out the functions of embodiments of the invention.

Program/utility (240), having a set (at least one) of program modules (242), may be stored in memory (228) by way of example, and not limitation, as well as an operating system, one or more application programs, other program modules, and program data.

Each of the operating system, one or more application programs, other program modules, and program data or some combination thereof, may include an implementation of a networking environment. Program modules (242) generally carry out the functions and/or methodologies of embodiments of the invention as described herein.

Computer system/server (212) may also communicate with one or more external devices (214) such as a keyboard, a pointing device, a display (224), etc.; one or more devices that enable a user to interact with computer system/server (212); and/or any devices (for example, network card, modem, etc.) that enable computer system/server (212) to communicate with one or more other computing devices. Such communication can occur via Input/Output (I/O) interfaces (222). Still yet, computer system/server (212) can communicate with one or more networks such as a local area network (LAN), a general wide area network (WAN), and/or a public network (for example, the Internet) via network adapter (220). As depicted, network adapter (220) communicates with the other components of computer system/server (212) via bus (218). It should be understood that although not shown, other hardware and/or software components could be used in conjunction with computer system/server (212). Examples, include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A computer program product comprising a computer usable memory including a computer readable program, wherein the computer readable program when executed on a computer system causes the computer system to execute program code for controlling configuration of a computer system comprising at least one exchangeable component, the program code executable by a processor to:
   generate a first pair of a first private key and a first public key for each accepted manufacturer of the exchangeable components and a second pair of a second private key and a second public key for the computer system;
   assign an identifier for each exchangeable component available for attachment to the controlled computer system and store the identifier together with a signature over the identifier generated with the first private key, the identifier and the signature being encrypted with the second public key;
   receive configuration data comprising a list of encrypted identity records comprising identifiers of the components together with signatures over the data generated with the first private key of each component expected to be attached to the respective computer system, and decrypt data with the second private key stored on the computer system and store the received configuration data together with the signature generated from the first private key of each expected component in a configuration database;
   receive a configuration record from the configuration database comprising configuration data on a controlled computer system and compare the configuration data of each expected component from the received configuration record with the configuration data of the components currently attached to the computer system, and reporting any mismatches, wherein the comparison uses the stored identifier, and wherein a signature is verified using the first public key stored in a secure area in computer system firmware;
   create the signature for validating the identifier of the component using the first private key for creating the signature of the manufacturer and/or encrypting with the second public key;
   requesting the exchangeable component by a component order;
   providing the world-wide unique number as an identifier for the component;
   creating an identity record comprising the world-wide unique number and optional identification data of the computer system and a customer of the computer system;
   signing the identity record with the signature using the private key;
   reading the identity record;
   retrieving a system ID;

decrypting with the private key of the computer system and validating the signature of the identity record with the first public key;

importing the configuration data into the configuration database;

connecting the component to the computer system;

sensing the component configuration data currently attached by the computer system; and comparing the exchangeable component configuration data from the received configuration record with the configuration data of the components currently attached to the computer system.

2. The computer program product of claim 1, further comprising program code to enable components which are already attached but not enabled to the computer system.

3. The computer program product of claim 2, further comprising program code to ensure the attachment of authorized and functional components.

4. The computer program product of claim 1, further comprising program code to decrypt the identifier with the second private key and validate the signature on the computer system using the first public key.

* * * * *